United States Patent [19]

Weber

[11] 4,108,551

[45] Aug. 22, 1978

[54] OBSERVATION AND AIMING APPARATUS, PARTICULARLY ON A VEHICLE

[75] Inventor: Claude Edmond Georges Weber, Bois-Colombes, France

[73] Assignee: Societe d'Etudes et de Realisations Electroniques, Asnieres, France

[21] Appl. No.: 750,653

[22] Filed: Dec. 15, 1976

[30] Foreign Application Priority Data

Dec. 29, 1975 [FR] France .................. 75 39960

[51] Int. Cl.² ........................ G01C 3/08; G02B 5/08
[52] U.S. Cl. ................................ 356/4; 250/333; 350/301; 356/5; 356/152
[58] Field of Search ................ 89/41 L; 250/333; 350/301, 52, 21-24; 356/4, 5, 141, 152

[56] References Cited

U.S. PATENT DOCUMENTS

| 3,200,250 | 8/1965 | Bouwers | 250/333 |
| 3,464,757 | 9/1969 | Schmidt et al. | 350/52 |
| 3,549,231 | 12/1970 | Scidmore et al. | 350/52 |
| 3,610,755 | 10/1971 | Wieberger et al. | 356/4 |
| 3,715,953 | 2/1973 | Allan | 244/3.16 |

OTHER PUBLICATIONS

Scidmore, *Army R. and D. News Magazine*, Sep.-Oct. 1974, pp. 20, 21.

*Primary Examiner*—S. C. Buczinski

[57] ABSTRACT

The invention relates to periscopic apparatus for the observation and aiming or sighting apparatus, particularly for mounting on a vehicle, having a stabilized panoramic gunsight head positioned externally of the vehicle and a corresponding sight tube with at least one eye piece positioned within the said vehicle. The sight tube and the gunsight head are interconnected by a wall-traversing periscopic ferrule which can be substituted by a sleeve in which is placed either a nocturnal vision means or a ranging means or both of the said means.

12 Claims, 5 Drawing Figures

OBSERVATION AND AIMING APPARATUS, PARTICULARLY ON A VEHICLE

BACKGROUND OF THE INVENTION

The invention relates to aiming or sighting apparatuses, particularly to a periscope for mounting on vehicles. In the case of vehicles such as tanks various problems occur as a function of circumstances and situations which can be solved specifically by one or more of diurnal observation, nocturnal observation, and sighting and measurements of target range.

Certain uses are satisfied if one of these problems can be solved whereas others require that two or even three of them are solved.

BRIEF SUMMARY OF THE INVENTION

The object of the present invention is to make it possible to satisfy such requirements. To this end the present invention relates to an apparatus having a modular construction which by combining components ensures diurnal vision, nocturnal vision and distance measurements of a target either separately or in twos or threes simultaneously.

The apparatus of this type is more particularly intended for use on tanks enabling their crews to carry out by day observations over a wide range or over a smaller but greatly magnified range, a distance measurement by means of a target no matter what firing corrections are introduced, and then at night a possible passive observation of the ground which assists movement and also aids the close defence of the vehicle.

All these observations, measurements and sightings can take place by day or by night via the eyepieces of such an apparatus depending on whether it is equipped with a single objective, one or two eyepieces or two objectives and two eyepieces.

According to the invention the apparatus comprises a stabilised panoramic gunsight head positioned externally of the vehicle and a corresponding sight tube with at least one eyepiece positioned within the said vehicle, whereby said sight tube and said gunsight head are interconnected by a wall-traversing periscopic ferrule which can be substituted by a sleeve in which is placed either a nocturnal vision means or a range finding means or both of the said means.

According to a preferred embodiment, the gunsight head is equipped with an occultable galilean optical member making it possible to vary the field of observation. In turn the sight tube is equipped with a Pechan prism whereof the orientation like that of the gunsight head equipped with a stabilised mirror is servo-controlled from the said mirror rotating about a bearing axis.

This sleeve can be fitted in place of the above-mentioned ferrule and contains the nocturnal vision means equipped with a light-amplifying element which can be occulted outside the optical path passing through the space between the sight tube and the gunsight head and which can be extended when placed on the said path.

This sleeve can also contain an element which is complementary to the ranging means which can be placed on the said path.

When this sleeve has both the light-amplifying means and the ranging means, the above-mentioned complementary element can be alternately occulted with the light-amplifying means to leave space for the latter.

The ranging means comprises a generator for light-amplification by stimulated emission of radiation, normally called a laser, and the complementary ranging element is a dichroic sheet.

This laser generator is associated with a receiver which receives the corresponding light reflected on the target and returns it to the sight tube, and with a reticule projector whose projection axis intersects on the said sheet the axis of the laser light beam returning from the target, and then encounters a trihedron on the other side of the said sheet relative to the projector which reflects the image of the reticule viewed through the said sheet, whereby the latter returning it into the sighting axis. All this serves to obviate problems of axis alignment during the returning into position in the said sighting path of the said occultable dichroic sheet.

In the same way and in very advantageous manner, these same problems are obviated during the assembly and disassembly of the intermediate sleeve.

The light-amplifying member is carried by a tubular telescopic member which can be extended and retracted when its axis is located in the sighting path and has means for locking it in the extended position.

Obviously driving means are located in this sleeve to bring about the alternate putting into service of the light-amplifying means and the ranging means.

In the same way, driving means are provided for extending or retracting the telescopic tube carrying the light amplifier. These driving means preferably comprise a tape which can be unwound from a drum and having a thrust action on extension due to the fact that it has a high resistance to buckling but behaves in the manner of a band on rewinding during retraction.

In the servo-mechanism of the Pechan prism a reversing device is provided whose action makes it possible to erect the image during nocturnal observation when the light-amplifier supplies an inverted intensified image relative to that which can be observed in diurnal vision.

Thus, the present apparatus can be readily adapted to all requirements with a minimum of components, a limited number of adjustments being necessary during each of the various fittings or changes.

BRIEF DESCRIPTION OF THE DRAWINGS

Other and further objects of the present invention will be apparent from the description and claims, and are illustrated in the accompanying drawings which by way of illustration show preferred embodiments of the invention and the principles thereof and what are now considered to be the best modes contemplated for applying these principles. Other embodiments of the invention embodying the same or equivalent principles may be used and structural changes may be made if desired by those skilled in the art without departing from the invention and the scope of the appended claims.

BRIEF DESCRIPTION OF THE DRAWINGS

The drawings show:

Figures 1, 2:
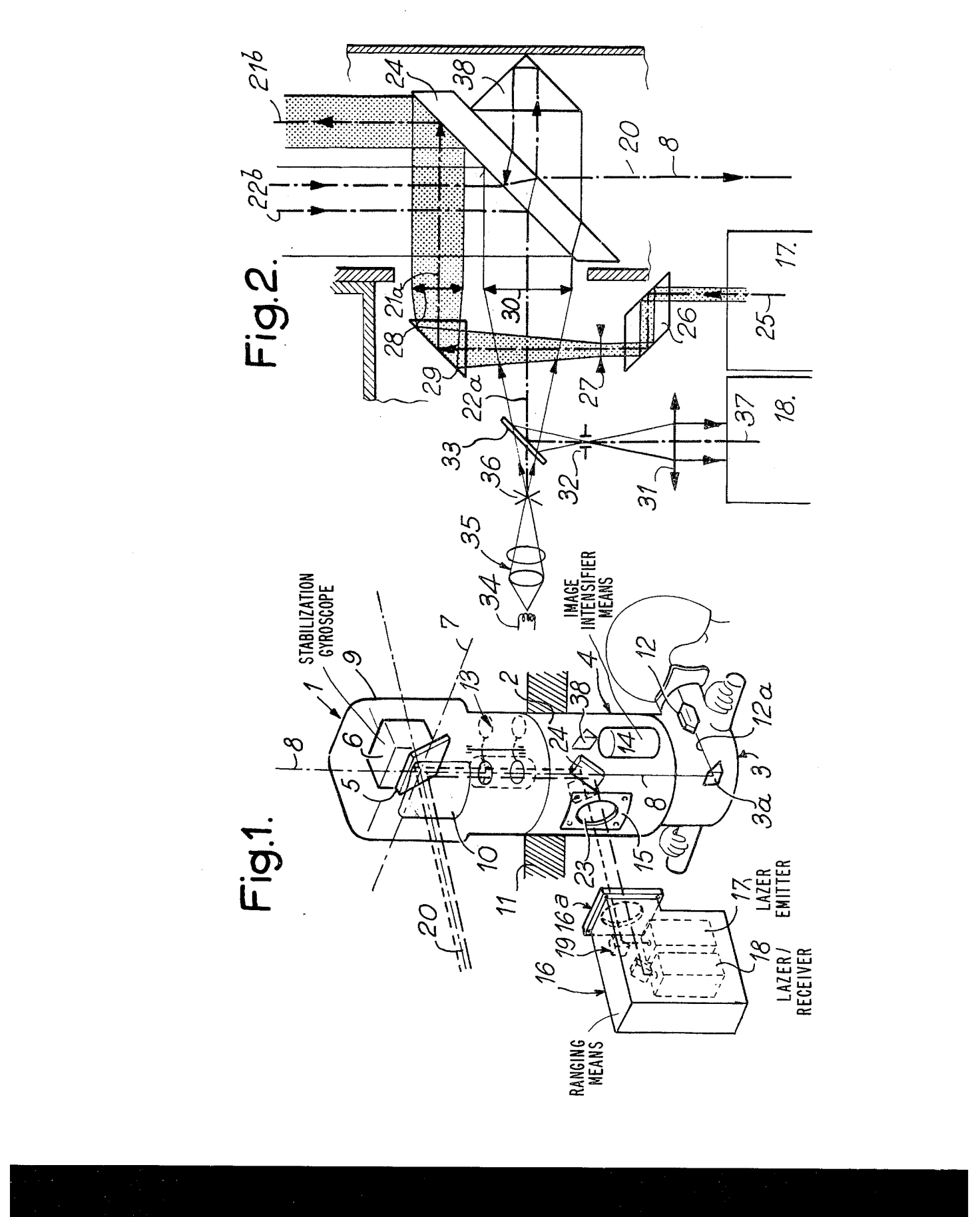

FIG. 1, a schematic perspective view of a complete apparatus.

FIG. 2, a diagram of the optical range finding paths in the sight tube.

Figure 3:
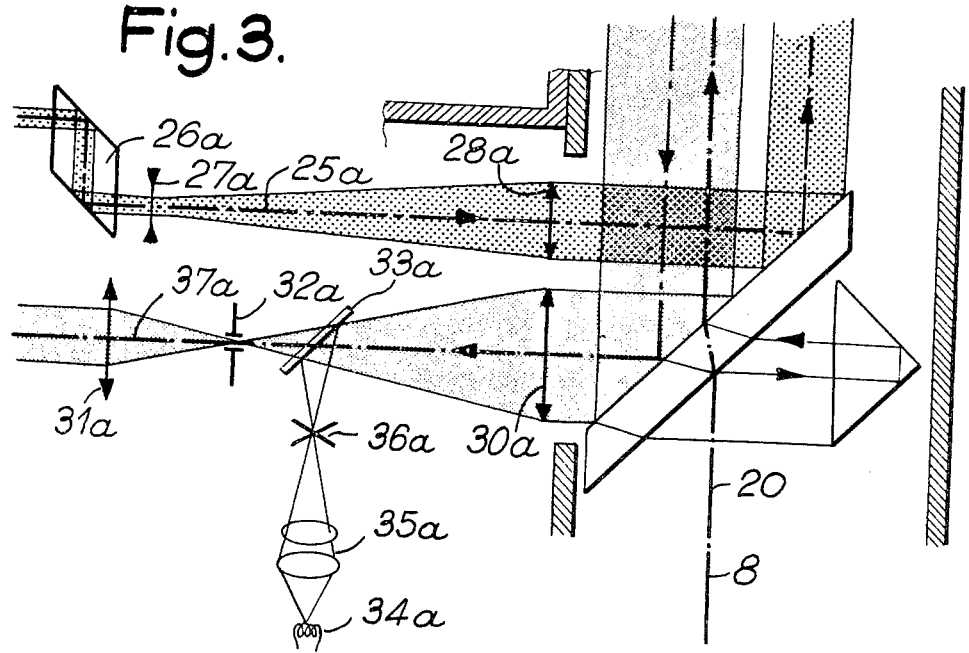

FIG. 3, a variant of FIG. 2.

Figure 4:
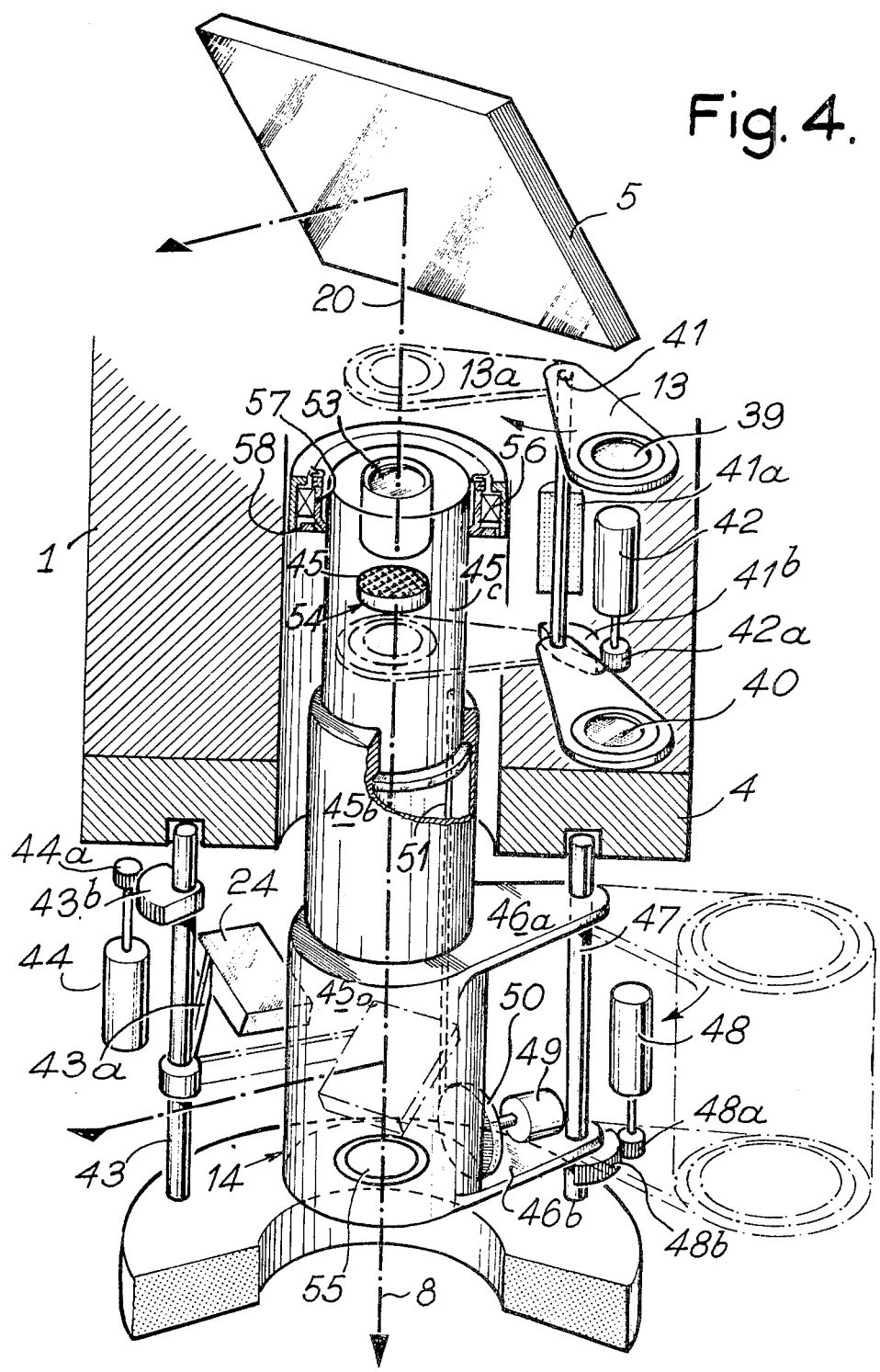

FIG. 4, a schematic perspective view of the light-amplifier system which can be inserted alternately with the dichroic sheet system.

Figure 5:
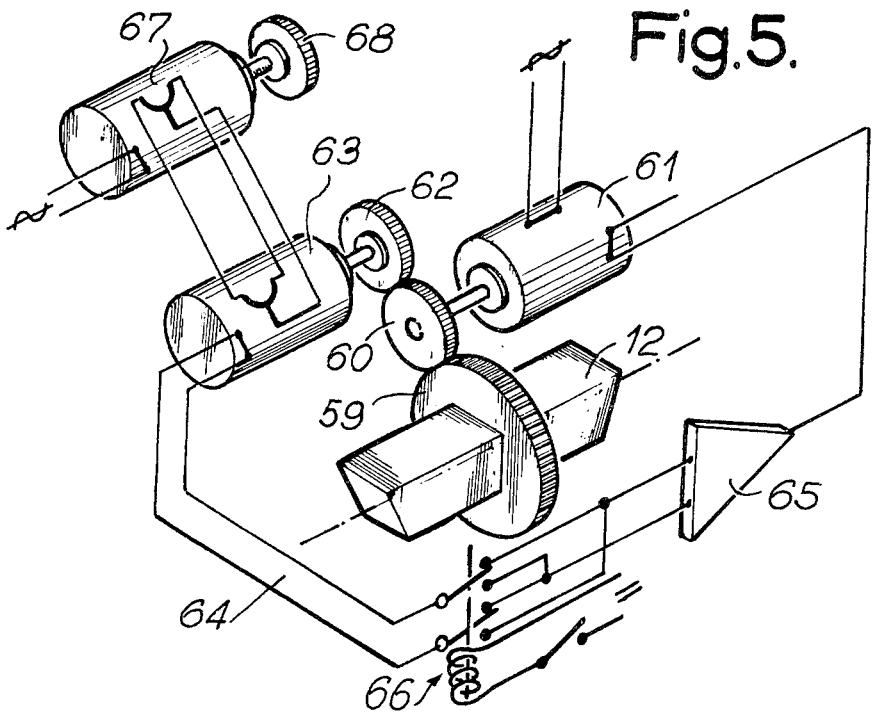

FIG. 5, a schematic perspective view of the servo-mechanism of the Pechan prism.

DETAILED DESCRIPTION OF THE PREFERRED EMBODIMENTS

The periscopic apparatus shown in the drawings comprises a stabilised gunsight head 1 associated with an aiming and observation sight tube 3 connected to the head 1 either by a ferrule 2 or by a sleeve 4, whereby the interchangeable ferrule and sleeve traverse a supporting wall 11 belonging to a combat vehicle structure. The gunsight head 1 projects upwards in the manner of a periscope and the sight tube 3 located inside is accessible to a hidden observer.

The gunsight head 1 contains a mirror 5 which is able to pivot about a sight axis 7 and which can assume any useful orientation and can then pivot about a bearing axis 8 without limitation. This mirror is controlled by a stabilisation gyroscope contained in a box 6 located in head 1. This assembly is contained in head 1 within a casing 9 thereof, said casing being provided in front of mirror 5 with a transparent window 10 which can be closed. Casing 9 is mounted so as to rotate about bearing axis 8 and pivots by servo-control under manual drift action and automatic stabilisation action about the said axis. Other than stabilisation, the result of the servo-control action can be to pivot the casing 9 by an angle equal to that by which the observer has rotated mirror 5 for bearing purposes, for example by causing a precession of the corresponding gyroscope about an appropriate axis.

Casing 9 and all that is contained therein is pivoted relative to sight tube 3 and ferrule 2 or sleeve 4 integral with the structure 11 of the vehicle, by any desired servo-mechanism which is not shown and which will not be described in detail here.

In addition to a fixed prism 3a which bends the axis of vision which coincides with the bearing axis 8 in the direction of an optical axis 12a directed towards the eyepiece or eyepieces, sight tube 3 contains a Pechan prism 12 located between the said prism 3a and the said fixed eyepiece of eyepieces of sight tube 3. The function of such a Pechan prism is to maintain the horizontality of the countryside observed no matter what the sighting direction compared with the axis of travel of the vehicle in the fixed eyepieces. The servo-control means which actuate the Pechan prism will be described with regard to FIG. 5.

Head 1 contains a movable galilean member 13 which can be occulted outside the path formed by the optical sighting path of axis 20 which coincides with the bearing axis 8. When this galilean member 13 is placed on this axis between mirror 5 and prism 3a, it divides the magnification of the sight tube by it own magnification thus increasing the field of vision in the same ratio. However, when it is removed therefrom the field of observation is reduced but the nominal magnification of the sight tube is restored.

Thus, the optical apparatus may comprise solely the gunsight head 1, sight tube 3 and ferrule 2 which joins the same and supports them on structure 11 in the case that the function to be fulfilled is limited solely to day-time observation with a variation of the field for successive surveillance observations and more detailed observations of the points of interest.

To ensure other functions the ferrule 2 can be substituted by a sleeve 4, whereby a nocturnal vision means 14 is contained in the same sleeve and which via a connection interface 15 can receive an external range finding unit 16. This interface is a flanged base to which can be connected a linked flange 16a causing a lateral opening in sleeve 4 and an identical outlet opening in unit 16 to face one another. Unit 16 comprises a box containing a laser emitter 17, a laser receiver 18 and associated optical elements 19 which will be described in greater detail hereinafter. The lateral opening of base 15 faces an occultable dichroic sheet 24 and a fixed trihedron which will be described in detail hereinafter. The precise connection between flange 16a and base 15 makes it possible to install or remove the ranging unit 16 without involving any difficult problem of coincidence between the sighting axis defined by the projection of a reticule in the eyepieces of sight tube 3 and the laser light reception and emission axes, as will be shown hereinafter. Moreover, sleeve 4 and its ancillary means are arranged in such a way that it is simple to combine and select ranging functions, diurnal vision and nocturnal vision.

In accordance with the axis of opening 23 of base 15 and in accordance with the axis 20 of the optical path which coincides with the axis of vision in the sleeve, the feature of the dichroic sheet 24 is that it is transparent, therefore permitting the passage of visible light beams in the direction of the eyepiece of eyepieces of sight tube 3, but reflects the laser light beams, i.e. not only directs the beam 21a from emitter 17 (FIG. 2) in the direction of mirror 5 which then directs the said beam onto a target parallel to the sighting axis, but also reflects towards receiver 18 the laser light beam returning from the target after reflection on mirror 5.

As can be seen in FIG. 2, emitter 17 and receiver 18 offer parallel optical axes 25 and 37. On axis 25a rhombohedron 26 reduces the centre to centre distance between the emission beam and the reception beam whose initial spacing results from the necessary physical dimensions of the emitter 17 and the receiver 18. On the emission beam path a divergent lens 27 is followed by a total reflection prism 29 and then by a convergent lens 28, thus forming an objective which makes afocal the laser emission path of axis 21a falling on the dichroic sheet 24. The optical return path of axis 22b parallel to bearing axis 8 has on the corresponding optical axis 22a after reflection on sheet 24 a first convergent lens 30, then after a semi-transparent mirror 33 and behind a subsequent diaphragm 32 a second convergent lens 31 on axis 37 which thus makes the reception path afocal. Diaphragm 32 placed in the object focal plane of this reception objective defines the reception field and prevents multiple echoes in the reception of ranging signals.

A source 34 located behind a condenser 35 lights up a reticule 36 placed on the focal plane of condenser 35 which coincides which that of the convergent lens 30 viewed through the semi-transparent mirror 33. The illumination of reticule 36 forms a beam traversing sheet 24 with deflection parallel to itself returned by a trihedron 38 and then reflected by the rear face of said sheet 24 exactly onto axis 8 as shown in FIG. 2.

Such an optical diagram is suitable for an arrangement of emitter 17 and receiver 18 with their optical axes 25 and 37 located in the incident plane of dichroic sheet 24 and parallel to axis 20.

However, for dimensional reasons it may be necessary to position emitter 17 and receiver 18 differently whilst retaining their optical axes 25 and 37 in the incident plane but placing the optical axes perpendicular to axis 20. This is shown in FIG. 3 where prism 29 is eliminated but where the rhombohedron 26a for bringing together axes 25a and 37a, divergent lens 27a and convergent lens 28a coaxial for the emission objective, convergent lenses 30a and 31a coaxial for the reception objective, a diaphragm 32a on axis 37a as well as a semi-transparent mirror 33a, reticule system 36a, condenser 35a and the source 34a having its optical axis perpendicular to axis 37a facing mirror 33a are retained. The function of mirror 33a is the opposite to that of mirror 33; thus, it permits the passage of coherent light to the laser receiver but reflects the projection of the reticule.

FIG. 4 partly shows intermediate sleeve 4 and its content beneath the lower portion of the gunsight head 1 in which are solely shown mirror 5 and galilean member 13 constituted by two lenses 39 and 40 fixed in mountings perpendicular to a pivot pin 41 parallel to sighting axis 20. These mountings are integral with the ends of pin 41 which rotates in a bearing 41a connected to the inner frame of head 1 and which can therefore move in the manner shown from position 13 into position 13a perpendicular to the said axis. Pivot pin 41 is integral with a toothed segment 41b with which meshes a pinion 42a carried by the shaft of a control motor 42 which serves to insert or remove from the optical path lenses 39 and 40. Insertion corresponds to diurnal observation with an extensive field and removal to diurnal observation with a reduced field but with greater magnification. This situation of occulting the Galilean system is maintained in the case of nocturnal observation both for sighting or aiming and for ranging on a target.

In order to put into service the nocturnal observation function the above-mentioned device 14 is used which is mounted on a pin 47 parallel to sighting axis 20 by two arms 46a, 46b which support body 45a of said means 14. One of the arms 46b carries a toothed segment 48b with which cooperates a pinion 48a carried by the shaft of a motor 48. In addition, one of the arms 46a, 46b supports a geared motor 49 whose output shaft carries a drum 50 onto which can be wound a special band 51. On winding and unwinding this band is flexible with regard to the drum but it is rigid when it is free and rectilinear.

In body 45a there is slidingly mounted an intermediate bush 45b wherein slides a tube 45c which is attached to band 51. It contains a micro-channel light amplifier 45 of per se known construction and able to detect low level light signals and to restore them in amplified manner on a rear screen 45.

The end of tube 45c carries an objective 53 and cooperates with articulated locking clamps 57 facing an armature 58 associated with a magnetic coil 56 and which is able to swing clamps 57 towards tube 45c when the telescopic device is extended. Moreover, at the opposite end of the telescopic device body 45a carries a convergent optical system 55 which makes the nocturnal vision path afocal and optionally divides the magnification of the sight tube by its natural magnification in order to obtain that which is adapted to nocturnal vision.

In order to permit the insertion of the nocturnal vision device 14 in sighting axis 20 which coincides with bearing axes 8, dichroic sheet 24 is occultable and is supported by an arm 43a integral with a pivot 43 to which is fixed a toothed segment 43b which meshes a pinion 44a mounted on the shaft of a motor 44.

As can be seen in FIG. 5, the Pechan prism 12 of sight tube 3 is mounted in a toothed rim 59 which is able to rotate in all appropriate not shown guides under the action of a pinion 60 integral with the output shaft of a motor 61. A second pinion 62 carried by the shaft of a detector 63 meshes with pinion 60. The detector is connected by a line 64 to an amplifier 65 which controls motor 61 with the interpositioning of a changeover relay 66 placed between the outputs of detector 63 and the inputs of amplifier 65.

Another detector 67 is located in gunsight head 1 with connection by toothed wheels (only one wheel 68 is shown) with the rotary casing 9 or any other member integral therewith or which will be directly or indirectly connected therewith in head 1, whereby the ratio of the gear train is equal to unity. Detector 67 is electrically connected to detector 63. The gear ratio between pinions 60 and 62 is equal to unity whilst that provided between pinion 60 and rim 59 is equal to ½.

For all diurnal observations, to which correspond a first position of changeover relay 66, prism 12 is servo-controlled in the ratio ½ to the rotation in bearing of mirror 5 and in corresponding manner erects the image viewed in the eyepiece or eyepieces. In this situation assembly 14 is obviously contracted and occulted outside the path of the light rays of the observation path whose axis coincides with axis 20 and axis 8.

For nocturnal observation device 14 is inserted in axis 20 with lateral occulting of sheet 24, extension by the force of band 51 and members 45a, 45b and 45c followed by the locking of a member 45c in armature 58 by clamps 57 which prevents any undesired movements resulting from external accelerations or vibrations. Changeover relay 66 can remain in the above position if image intensifier 45 does not introduce an optical inversion compared with diurnal vision. If inversion occurs the electrical changeover relay 66 is operated and changes position which leads to a rotation of the Pechan prism 12 by a quarter of a turn. For this purpose, it is merely necessary to electrically connect the coil of relay 66 to the supply system of motors 44, 48, 49 when the latter are controlled in insertion and extension of the nocturnal vision system. On a signal to return to diurnal vision the reverse actions take place, i.e. the Pechan prism is returned to the initial position, the telescopic members of assembly 14 are retracted and the latter is laterally occulted and, if necessary, sheet 24 is returned on axis 8. Optical inversion by controlled rotation of the Pechan prism is a simpler and more advantageous solution than the introduction into system 14 of an optical erecting device which would complicate the internal arrangement of members 45a, 45b and 45c of device 14. In order to obtain the displacement by a quarter of a turn of prism 12 it is merely necessary to displace the electrical servo-mechanism by 180° in accordance with the ratio ½ provided between prism 12 and detector 63.

As will be gathered from what has been stated hereinbefore, this equipment can be used for simple diurnal observation functions with double magnification if head 1 is connected to sight tube 3 by a ferrule 2, whereby it is possible to add to these functions that of nocturnal observation by substituting for ferrule 2 a sleeve 4 which is internally provided with an occultable device 14. In addition, such a system can be provided with an aiding or sighting and ranging function by combining with sheeve 4 a laser emitter and receiver system 16 with a reticule projector, whereby this system may or may not be linked with the existence in sleeve 4 of the nocturnal observation system 14. If this system is present, sheet 24 is mounted on a movable support 43a which permits occulting.

It is thus possible to satisfy the requirements of the least demanding users as well as users having greater or even maximum demands whereby maximum adaptability is provided.

The invention is not limited to the embodiments described hereinbefore and various modifications can be made thereto without passing beyond the scope of the invention.

What I claim is:

1. A periscope comprising a panoramic sighting head for visually sighting on an object, and a sighting tube in association therewith having at least one eyepiece for an observer, said sighting tube and said sighting head being arranged to have an optical path therebetween, laser telemetry means having an emitter and receiver mounted in association with said sighting head and said sighting tube, a dichroic mirror having a front face reflecting the beam from said laser emitter toward the object and for reflecting the beam from said object toward said laser receiver, a reticule located in front of said dichroic mirror, and a reflecting trihedron located behind said dichroic mirror for causing the reflection of the image of said reticule from the rear face of said dichroic mirror to said eyepiece and image intensifying means for nocturnal vision, said dichroic mirror and said image intensifying means being movably mounted for alternate positioning along the optical path whereby said optical path is common for daytime vision, nighttime vision and laser telemetry.

2. The periscope according to claim 1, wherein said dichroic mirror, said trihedron and said image intensifying means are located within a common housing removably mounted between said sighting head and said sighting tube.

3. The periscope according to claim 2, wherein said laser means is mounted on the exterior of said housing, said housing having an opening for the passage of the emitted and received beams of said laser means.

4. The periscope according to claim 3, wherein said laser telemetry means includes means for arranging the emitter and receiver beams in close parallel relationship.

5. The periscope according to claim 1, in which said panoramic sighting head comprises a casing containing an input mirror pivotal around an axis of elevation and an axis of lateral deflection and means for stabilizing said input mirror in selected positions, said casing having a transparent aperture in front of said input mirror.

6. The periscope according to claim 5, wherein said casing is rotatable about a central axis and the sighting tube includes a Pechan prism located in front of said eyepiece having servo control means responsive to the movement of said input mirror about the axis of lateral deflection to rotate said Pechan prism and said casing.

7. The periscope according to claim 6, wherein the servo control means comprises a detector for producing a signal indicative of the lateral deflection, an amplifier for said signal, a servo motor responsive to said amplified signal, and an inverter, said inverter selectively causing rotation of said Pechan prism by 90° on introduction of an image magnifier in said optical path producing an inverted image.

8. The periscope according to claim 7, including a Galilean lens system and means for retractably introducing said Galilean lens system in said optical path.

9. The periscope according to claim 1, in which the image magnifier is mounted on the movable member of a telescopic system, and includes means for extending and retracting said movable member comprising a drum member and means for connecting said drum to said movable member, said connecting means being sufficiently flexible to be wound about said drum and sufficiently rigid to push/pull said movable member when unwound therefrom.

10. The periscope according to claim 9, wherein said connecting means is a metallic band being in cross section arcuate.

11. The periscope according to claim 9, including means for locking said movable member in selected extended positions.

12. The periscope according to claim 1, wherein said reticule is provided with a projection, and a semi-transparent mirror, and said reticule having a light beam coincident with said laser telemetry receiver beam.

* * * * *